(No Model.)
H. & G. H. KIMBLER.
SHEEP SHEARS.
No. 347,878. Patented Aug. 24, 1886.
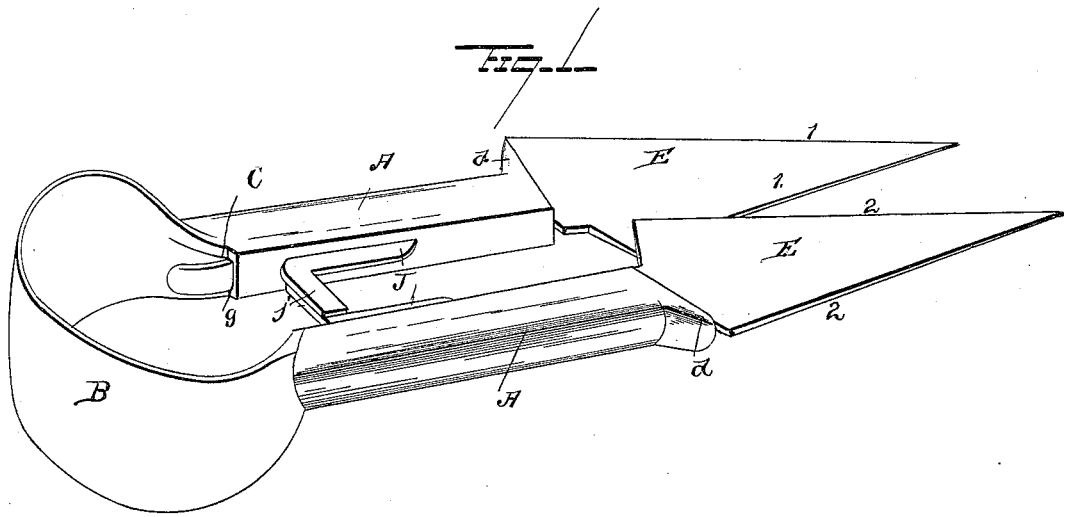
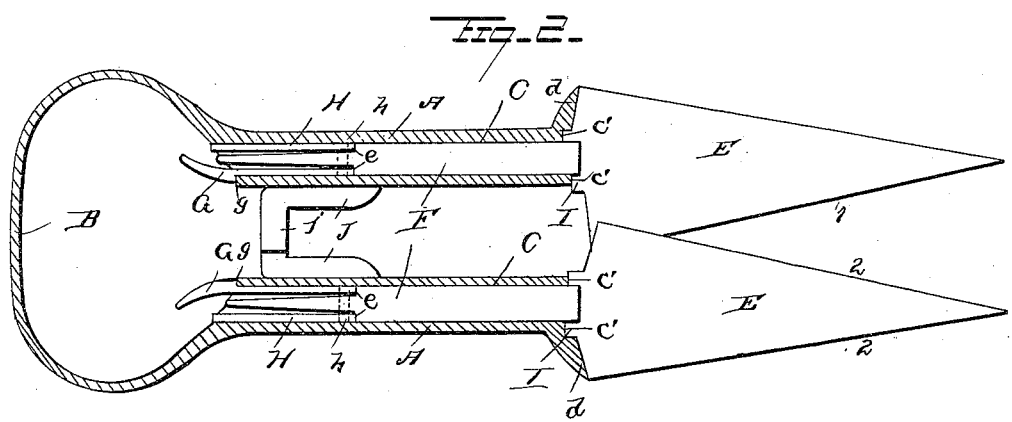
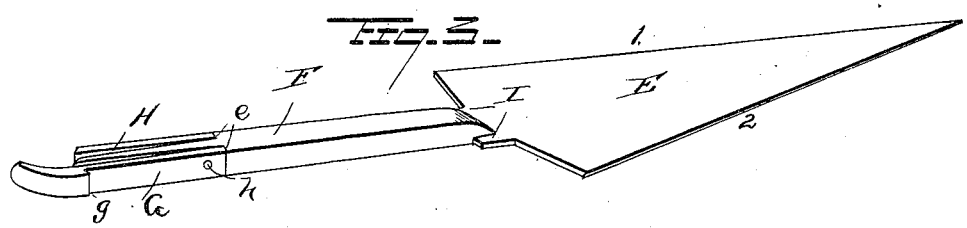
Witnesses:
Inventors:
Henry Kimbler
Geo. H. Kimbler
By their Attorneys

UNITED STATES PATENT OFFICE.

HENRY KIMBLER AND GEORGE HARRY KIMBLER, OF CREELSBOROUGH, KY.

SHEEP-SHEARS.

SPECIFICATION forming part of Letters Patent No. 347,878, dated August 24, 1886.

Application filed June 19, 1886. Serial No. 205,697. (No model.)

*To all whom it may concern:*

Be it known that we, HENRY KIMBLER and GEORGE HARRY KIMBLER, citizens of the United States, residing at Creelsborough, in the county of Russell and State of Kentucky, have invented a new and useful Improvement in Sheep-Shears, of which the following is a specification.

Our invention relates to improvements in sheep-shears; and it consists of the peculiar combination and novel construction and arrangement of the various parts for service, substantially as hereinafter fully set forth, and particularly pointed out in the claims.

The object of our invention is to provide means whereby the blades can be easily and readily detached from the handles of the implement to reverse them and bring two of the four cutting-edges of the said blades into use when the other two cutting-edges have become dulled through use or otherwise; to provide means whereby the blades are very securely and rigidly held in proper place in the handles and are prevented from becoming easily detached; to provide means for guiding the handles in their vibrating movements under the pressure of the hand, and to improve the shears in minor details of construction, so that they will be simple and strong in construction and cheap of manufacture.

In the accompanying drawings, which illustrates a pair of shears embodying our invention, Figure 1 is a perspective view. Fig. 2 is a longitudinal central sectional view through the device. Fig. 3 is a detached perspective view of one of the removable blades.

Referring to the drawings, in which like letters of reference denote corresponding parts in all the figures, A designates the handles of our improved shears for shearing sheep and other animals, which are adapted to be forced toward each other under the pressure of the operator's hand, who grasps the same, and the handles are forced apart or away from each other, when the hand-pressure thereon is released, by a curved spring, B, which connects the handles at one end and normally forces them away from each other, so as to hold them distended or separated. The spring is made flat, preferably, and formed integral with or rigidly secured to the handles; but we prefer to form it in one piece with the handles, as we thereby increase the strength and durability thereof. The handles are preferably curved in cross-section to dispense with sharp or angular corners, which are liable to injure or hurt the hand of the operator when the device is in continuous use for some time; and the handles are further provided with longitudinal openings or passages C, which extend entirely through the handles and open through the ends thereof, the front ends of the handles being provided with integral flared lugs or flanges $d$. These lugs are recessed to form shoulders $c'$, and the outer faces of the lugs are inclined or beveled, for a purpose presently described.

E designates the removable blades, one of which is provided for each of the handles A. These blades are each provided with an integral shank, F, which is arranged at an angle to the blades, the rear end of the shank being reduced on opposite sides to form the shoulders $e$, against which are fitted the ends of a locking and spring arm, G and H, respectively. These arms are arranged on opposite sides of the shank of the blade, and they are secured to and carried by the shank by means of a pin or rivet, $h$, that passes through one end of both of the arms, and leave the opposite ends of the arms free to bear against the sides of the longitudinal passage of the handles in applying or detaching the blades to and removing them from the handles. The arms G and H are made of spring metal, so that they spring outwardly or away from the shanks of the blades and bear against the sides of the longitudinal passages of the handles, and the outer free end of the arm G is provided with a shoulder or nib, $g$, that is adapted to take or bear against the lower edges of the longitudinal passage of the handles when the shank is fitted therein, thereby preventing the shank from being withdrawn from the handle until the locking-shoulder is released from engagement with the handle. The locking-shoulder also provides a finger-piece, so that it can be conveniently operated, and it projects beyond the handle to one side of the point where the spring B joins the handle, so that the hand of the operator can be conveniently and readily fitted between the handles and the spring to actuate the locking-arm. The blades E are provided with inclined cutting-edges, which taper or converge toward each other until they terminate in a point, and both of the side edges of the blades are sharpened, as at 1 and 2, so that the blades can be reversed to bring the other unused edge into play when one edge has become dulled, as will be readily understood. When the device is in use, the blades are arranged at an angle to the handles and project outwardly therefrom, and the blades lap or slide freely over each other in their vibratory movements. The rear ends of the blades are reduced to provide the projecting tongues I, that fit in the recessed portions of the integral lugs or flanges of the handles and bear against the shoulder provided thereby, and by means of these tongues of the blades being in contact with the shoulders the blades are prevented from displacement or movement under the strain that is imposed thereon in shearing the wool off the sheep and other animals.

This being the construction of our invention, the operation thereof is as follows: The handles and the blades carried thereby are normally forced away from each other by the connecting-spring, and the hand-pressure on the handles by the operator forces the handles and the blades together and against the tension of the spring, so that the cutting-edges of the blades slide past each other and sever the wool from the sheep, and when the hand-pressure is released the spring again separates the handles and the blades or forces them apart, so that they are in position to again act upon and sever the wool. When one of the cutting-edges of both blades becomes dulled through use or other causes, the blades are detached or removed from the handles by merely disengaging the shoulders of the locking-arms G thereof from the lower edges of the handles, and the blades can then be withdrawn, the springs and the locking-arms being in contact with the sides of the longitudinal passage during such withdrawal of the shanks of the blades. The blades can now be turned over or reversed to bring their opposite unused cutting-edges into position for use, the blade of one handle being secured or fitted in the other handle of the shears, the blades being thus interchanged. When the blades are being fitted in the handles, the springs of the shanks thereof bear against the sides of the longitudinal passage of the handles, and when the said spring-arms emerge from the inner extremity of the handles the nib or shoulder of the locking-arm engages the lower edge of the passage without requiring any adjustment on the part of the operator.

Our improved shears are simple and strong in their construction, can be easily and readily operated, the blades can be quickly reversed, and are rigidly held in their proper relative positions, and the shears are cheap and inexpensive of manufacture. The handles are each provided with a guide, J, which is secured thereto or formed integral therewith, and each of these guides J is provided with an outwardly-extended lug, j, that bears upon the similar lug of the adjacent handle and prevents the handles from moving out of line with each other, the lugs of the guides being of sufficient length, so that they are always in contact with each other under the various positions of the handles.

Having thus fully described our invention, what we claim as new, and desire to secure by Letters Patent, is—

1. The combination of the handles, the spring connecting the handles and normally forcing them away from each other, and the reversible blades detachably secured in the handles and having the four cutting-edges, substantially as described, for the purpose set forth.

2. The combination of the hollow spring-actuated handles and the reversible blades having the four cutting-edges and the shanks fitted in the handles and carrying a locking-arm, substantially as described.

3. The combination of the hollow spring-actuated handles, the reversible blades having the angular shanks inserted in the handles, and the spring arms carried by the shanks, one having a locking shoulder or nib adapted to engage with the end of the handle, substantially as described.

4. A pair of shears comprising the hollow handles, having the enlarged shouldered lugs or flanges, a spring connecting and formed integral with the handles, the reversible blades having the four cutting-edges and the reduced tongues and the shanks, the spring-arms carried by the shanks, one of the said arms having a locking-shoulder, substantially as described.

5. The combination of the laterally-movable handles, a spring connecting the handles, the reversible blades carried by the handles, and the guides secured to the handles and bearing against each other to prevent the handles from coming out of line with each other, substantially as described.

In testimony that we claim the foregoing as our own we have hereto affixed our signatures in presence of two witnesses.

HENRY KIMBLER.
GEORGE HARRY KIMBLER.

Witnesses:
WILLIAM HIGGINBOTTOM,
JOHN McGINDER.